United States Patent

Polley et al.

[11] Patent Number: 5,809,069
[45] Date of Patent: Sep. 15, 1998

[54] FREQUENCY-DOMAIN CARRIERLESS AM-PM DEMODULATOR

[75] Inventors: Michael O. Polley, Garland; Walter Y. Chen, Plano; Donald P. Shaver, Dallas, all of Tex.

[73] Assignee: Texas Instruments Incorporated, Dallas, Tex.

[21] Appl. No.: 684,356

[22] Filed: Jul. 19, 1996

[51] Int. Cl.$^6$ ....................................................... H04B 1/38
[52] U.S. Cl. .......................... 375/222; 375/235; 375/269; 375/340; 364/724.12; 364/724.2
[58] Field of Search ...................................... 375/316, 322, 375/320, 260, 268, 271, 229, 230, 232, 340, 235, 269; 364/724.2, 724.12; 333/18, 28 R

[56] References Cited

U.S. PATENT DOCUMENTS

| | | | |
|---|---|---|---|
| Re. 31,253 | 5/1983 | Weinstein | 179/170.2 |
| 4,087,654 | 5/1978 | Mueller | 179/170 |
| 4,247,940 | 1/1981 | Mueller et al. | 375/14 |
| 4,464,545 | 8/1984 | Werner | 179/170 |
| 4,682,358 | 7/1987 | Werner | 379/411 |
| 4,800,573 | 1/1989 | Cupo | 375/14 |
| 4,924,492 | 5/1990 | Gitlin et al. | 379/93 |
| 5,052,000 | 9/1991 | Wang et al. | 371/43 |
| 5,285,474 | 2/1994 | Chow et al. | 375/13 |
| 5,317,596 | 5/1994 | Ho et al. | 375/14 |
| 5,400,322 | 3/1995 | Hunt et al. | 370/19 |
| 5,461,640 | 10/1995 | Gatherer | 375/231 |
| 5,479,447 | 12/1995 | Chow et al. | 375/260 |

OTHER PUBLICATIONS

Crespo, P., et al., Pole–Zero Decision Feedback Equalization for the Digital Subscriber Loop, Globecom '90, IEEE Global Telecomm. Conf. & Exhibit, San Diego, CA, Dec. 2–5, 1990, "Communications: Connecting the Future"; CH2827–4/90/0000–11666, 1990 IEEE, pp. 1166–1171.

Sistanizadeh, K., Analysis and Performance Evaluation Studies of High Bit Rate Digital Subscriber Lines (HDSL) Using QAM and PAM Schemes With Ideal Decision Feedback Equalization (DFE) Within a Carrier Serving Area (CSA), Globecom '90, IEEE Global Telecomm. Conf. & Exhibit, San Diego, CA, Dec. 2–5, 1990, "Communications: Connecting the Future"; CH2827–4/90/0000–1172, 1990 IEEE.

Veeneman, D., et al., ADSL for Video and Data Service, ICC '95 Seattle, WA, Communications—Gateway to Globalization, 1995 IEEE Int'l Conf. on Comm., Jun. 18–22, 1995; 0–7803–2486–2/95, 1995 IEEE.

Cook, John, *Splitter for VDSL*, T1E1.4 Contribution, American Nat'l Standards Institute Telecommunications Committee (ANSI/T1), 22–25 Jan. 1996, Irvine, CA Meeting, 10 pages.

Honig, M.L., et al., Suppression of Near–and Far–End Crosstalk by Linear Pre–and Post–Filtering, IEEE Journal on Selection Areas in Comm., vol. 10, No. 3, Apr. 1992, pp. 614–629.

Cioffi, J.M., et al., *Detailed DMT Transmitter Description for ADSL*, ANSI T1E1.4 Committee Contribution No. 93–084, Chicago, Apr. 1993, pgs.

Cioffi, J.M., et al., *DMT Specification Overview for ADSL*, ANSI T1E1.4 Committee Contribution No. 93–083, Chicago, Apr. 1993, pp.

Chow, J.S., *Finite–Length Equalization for Multi–Carrier Transmission Systems*, Ph.D. Dissertation, Stanford University, California, Jun. 1992.

(List continued on next page.)

*Primary Examiner*—Don N. Vo
*Attorney, Agent, or Firm*—Warren L. Franz; Wade James Brady, III; Richard L. Donaldson

[57] ABSTRACT

A frequency-domain CAP receiver is provided that reduces the number of operations required to demodulate a CAP signal. The frequency-domain CAP receiver provides computational advantages over an equivalent time-domain version as the filter length required in the receiver increases.

3 Claims, 4 Drawing Sheets

OTHER PUBLICATIONS

Chow, J.S., et al., *Equalizer Training Algorithms for Multicarrier Modulation Systems*, 1993 Int'l Conf. on Communications, Geneva, May 1993, pp. 761–765.

Chow, J.S., et al., *Recommended Training Sequence for Time–domain Equalizers (TQE) With DMT*, ANSI T1E1.4 Committee Contribution No. 93–968, pgs.

The Applied Technologies Group, AT&T Paradyne, *ADSL, SDSL, HDSL, Copper Phone Line Technologies for Multimedia*, Pocket Guide, One Apple Hill, #316, Natick, MA 01760 pp. 1–41.

AT&T Paradyne, News Release, *Bell Atlantic Supports AT&T Paradyne's GlobeSpan™ Technology*, Largo, Florida, Nov. 1, 1995, 34 pages.

Maxwell, Kim, *Study Project: ADSL Issue II—Variable Rate ADSL*, Independent Editions, 22 Apr. 1996, 1057 University Ave., Palo Alto, CA 94301, T1E1.4/95–129, 2 pages.

Starr, Tom, *Project: ADSL—Rate Adaptive DSL*, Apr. 22, 1996, Colorado Springs, Ameritech, 2000 W. Ameritech Drive, Rm. 3C52, Hoffman Estates, IL 60196, pp. 1–5.

Keyes, Philip J., *ADSL Standard Project—Proposal for Annex to ADSL Standard*, Apr. 22, 1996, Col. Springs, CO, Bell South Telcomm., 3535 Colonade Pkwy, Rm W1D1, Birmingham, AL 35243, 3 pgs.

Cook, John, *Telephony Transmission and Splitters, Passive and Active*, T1E1.4 Contribution, American Nat'l Standards Institute Telecomm. Comm. (ANSI/T1), 14–18 Feb. 1994 San Francisco Mtg, 14 pages.

Cioffi, J.M., et al., *Project: T1E1.4: ADSL—Rate Adaptation and the ANSI T1.413 DMT ADSL Data Rate Throttle*, Amati Comm. Corp., 1975 Mountain View, CA 94040, pp. 1–10.

Scholtz, W.H., et al., *Study Project: HDSL Study Project—Variable Bit Rate ADSL Using Carrierless AM/PM (CAP)*, Lucent Technologies, 101 Crawfords Corner Rd., Rm. 4L–322, Holmdel, NJ 07733–3030, pp. 1–4.

Lechleider, J.W., The Capacity of Next–Impaired Subscriber Loops, Bellcore, Globecom '90, IEEE Global Telecomm. Conf. & Exhibit, San Diego, CA, Dec. 2–5, 1990, "Communications: Connecting the Future"; CH2827–4/90/0000, 1990 IEEE.

ADSL Forum WWW Site, Dec., 1995: *About the ADSL Forum*, 8 pages.

ADSL Forum WWW Site, Dec., 1995: *ADSL—Twisted Pair Access to the Information Highway*, 4 pages.

ADSL Forum WWW Site, Dec., 1995: *VDSL—Fiber–Copper Access to the Information Highway*, 7 pages.

ADSL Forum WWW Site, Dec., 1995: *A Tutorial Glossary of Copper Access Transmission Terminology*, 10 pages.

ADSL Forum WWW Site, Dec., 1995: *The World is Already Wired for Multimedia Communications*, 2 pages.

ADSL Forum WWW Site, Dec., 1995: *Working Text: Interfaces and System Configurations for ADSL: Bit Synchronous Mode*, 15 pages.

ADSL Forum WWW Site, Dec., 1995: Daly, Tom (editor), *Study Project: Packet Mode Technical Group Working Text*, 12 pages.

Integrated Circuit Engineering Corporation, A Study of the MPU, MCU & DSP Markets, *Digital Signal Processors*, Microprocessor 1996, Editor: Bill McClean, Author: Jack Quinn, Scottsdale, AZ, pp. 12–19 to 12–33.

FREQUENCY-DOMAIN CARRIERLESS AM-PM DEMODULATOR

FIELD OF THE INVENTION

The present invention is related to modems, and more particularly, to a frequency domain CAP receiver for a modem.

BACKGROUND OF THE INVENTION

A Carrierless AM-PM (CAP) transmitter for a modem produces a passband line code directly, combining modulation and upconversion to passband frequencies. The data to be transmitted is filtered with passband shaping filters that produce energy in the required passband regions of the spectrum. CAP is very similar to quadrature amplitude modulation (QAM) followed by upconversion, but has a more convenient digital implementation when the transmitted signal's passband center frequency is close to the signal's bandwidth.

A conventional CAP transmitter is shown in FIG. 1. Complex data symbols 110 to be transmitted are upsampled by a factor of M 112 and split into their real 114 and imaginary 116 parts, which are filtered with the in-phase 118 and quadrature 120 CAP transmission filters $g_1[n]$ and $g_2[n]$, respectively. The filter outputs are combined 122 and the result is passed through a D/A converter 124 and low pass filtered 126 to produce the analog signal 128 required for the transmission medium.

An example of two practical orthogonal length-35 square-root raised-cosine CAP filters is shown in FIG. 2, the in-phase filter 140 is $g_1[n]$ and the quadrature filter 150 is $g_2[n]$.

A CAP receiver for a modem equalizes, performs downconversion from passband, and demodulates the line code with a single parallel filtering operation. In the absence of channel degradation, the receiver filters are very similar to the transmit filters, and can be conveniently implemented. However, as the channel characteristics become more difficult, the requirements for the length of the receive filter increase. For adequate performance, the filter length might have to be increased substantially. This length increase requires more computations per received symbol.

A conventional CAP receiver for a modem is shown in FIG. 3. The received analog signal 210 is low-pass filtered 212 and passed through the A/D converter 214. The digital signal 216 is then processed with the filters $h_1[n]$ 218 and $h_2[n]$ 220, which perform the CAP demodulation as well as channel equalization. Some form of channel estimation and equalization criterion is used to calculate the required values for $h_1[n]$ and $h_2[n]$. After filtering, the signals are combined 222 to form a complex data stream 224 and then downsampled by a factor of M to form a stream of complex data symbols 228 from which the transmitted information can be decoded.

When the transmission channel is distortionless, the filters in the receiver should be matched filters (matched to $g_1[n]$ and $g_2[n]$) to provide optimum reception. However, when channel distortion is detected, the receive filters must be adjusted to equalize the distortion as well as demodulate the CAP signal. The filters' ability to compensate for the channel distortion is affected by a number of factors, including the practical length chosen for the filter. When significant channel distortion is encountered, longer filters may be required. Indeed, restricting the filter length to that which can be practically implemented by time-domain filtering can limit the performance of a CAP receiver that has finite computational resources. Under these conditions, a frequency-domain CAP receiver of the present invention provides an attractive alternative to the computationally intensive time-domain implementation.

Further these and other shortcomings are overcome by the present invention.

SUMMARY OF THE INVENTION

A CAP receiver employing a reduced-complexity frequency-domain equalizer is provided. The number of operations required as a function of a time-domain filter length is compared to demonstrate that the FDE-based CAP receiver of the present invention is advantageous.

More particularly, the present invention provides a frequency domain CAP modem receiver, having a low pass filter connected to a data channel, an analog-to-digital (A/D) converter connected to the output of said low pass filter, a CAP frequency domain equalizer connected to said A/D converter, and a downsampler connected to said CAP frequency domain equalizer for outputting a stream of complex data signals for decoding.

Further, the present invention provides a method for generating a CAP signal from a passband signal by low pass filtering said passband signal, converting said filtered signal to a digital signal, and CAP frequency domain equalizing said digital signal to equalize and demodulate said digital signal.

DETAILED DESCRIPTION

Figure 4:
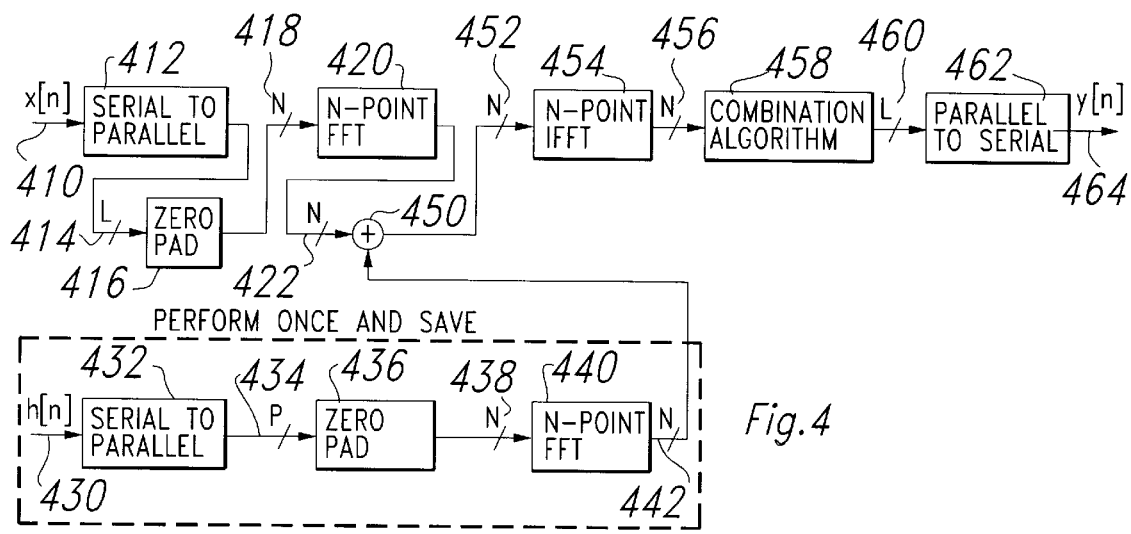
FIG. 4 shows a convolution implemented by multiplication in the frequency domain.

It is well known that computationally efficient frequency-domain algorithms exist for implementing a convolution of two discrete-time sequences x[n] and h[n] (Oppenheim, Alan V. and Schafer, Ronald W., *Discrete-Time Processing*, Prentice Hall, N.J., 1989; Rabiner, Lawrence R. and Schafer, Ronald W., *Digital Processing of Speech Signals*, Prentice Hall, N.J., 1978; Brigham, E. Oran, *The Fast Fourier Transform*, Prentice Hall, N.J., 1974; Brigham, E. Oran, *The Fast Fourier Transform and Its Applications*, Prentice Hall, N.J., 1988; Winthrop, W. Smith and Smith, Joanne M.,

*Handbook of Real-Time Fast Fourier Transforms*, IEEE Press, Piscataway, N.J., 1995). One algorithm to accomplish this is depicted in FIG. 4. Two sequences x[n] 410 and h[n] 430 are converted to a parallel data stream 412, 432 of lengths L and P, respectively, and then padded with zeroes 416, 436 to form length-N sequences 418, 438. Then, N-point discrete Fourier transforms (DFT) X[k] 420 and H[k] 440 of the two sequences are computed 422, 442. The DFT can be implemented with the computationally efficient fast Fourier transform (FFT) algorithm. Next, the product 450 is computed, Y[k]=X[k] H[k] 452. Finally, the inverse DFT y[n] 454, is computed 456, subjected to a combination algorithm 458 and converted to a serial stream 462. The sequence y[n] 464 is the circular convolution of the two input sequences, $$y_c[n] = \sum_{m=0}^{N-1} x[m]h[((n-m) \bmod N)]. \quad (1)$$

If the discrete-time sequences are finite, then the DFT size can be made large enough that the circular convolution of the zero-padded sequences is the same as the linear convolution of the sequences. If L represents the length of x[n] and P represents the length of h[n], then the resulting linear convolution of x[n] and h[n] is of length L+P−1. If N is chosen such that N>L+P−1, then the circular convolution obtained from the frequency-domain implementation is the same as the linear convolution of the two sequences, and y[n]=Y$_c$[n].

If the input sequence x[n] is too long to practically compute a single transform, or if x[n] is a continuous data stream, the sequence can be segmented into manageable lengths and processed a single segment at a time. The individual processed segments are then combined in a manner that forms the linear convolution of the two sequences. This segment combination procedure converts the circular convolution of many contiguous segments into a linear convolution. Two well-established combination procedures are the overlap-add and the overlap-save algorithms (Oppenheim, Alan V. and Schafer, Ronald W., *Discrete-Time Processing*, Prentice Hall, N.J., 1989).

The efficiency gains obtained from implementing a convolution in the frequency domain depends on the sizes of the two sequences to be convolved as well as the DFT size relative to the sequence sizes. In general, as the sequence lengths increase, the required time-domain convolution grows linearly with the size of one of the sequences. With the frequency-domain method, the length grows slowly.

For a complex input sequence x[n] and a complex filter h[n], the number of operations required to implement the time-domain filtering is $$4P+2(P-1) \text{ operations/sample}. \quad (2)$$

The number of operations required to implement the convolution in the frequency domain is $$\frac{4N\log_2(N) + 4N + 2L}{L} \text{ operations/sample}. \quad (3)$$

Figure 5:
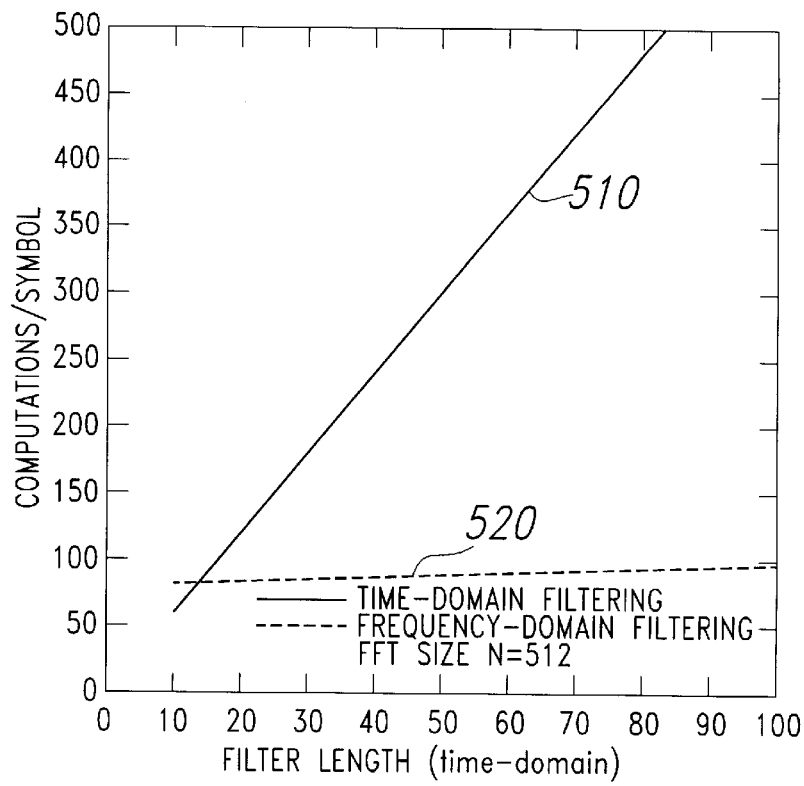
FIG. 5 shows a comparison of the number of operations required to implement a linear convolution of a complex signal with a complex filter in the time domain and frequency domain.

The required number of operations for the two approaches 510, 520 are plotted as a function of the length of the filter h[n] in FIG. 5.

If the input sequence x[n] and the filter h[n] are real, the number of operations required to implement the time-domain filtering is $$2P-1 \text{ operations/sample}. \quad (4)$$

Exploiting the fact that the input and output are real, the double-length FFT can be employed in the frequency-domain equalizer to reduce the number of required operations for the FFT and IFFT (Winthrop, W. Smith and Smith, Joanne M., *Handbook of Real-Time Fast Fourier Transforms*, IEEE Press, Piscataway, N.J., 1995). The number of operations required to implement the convolution in the frequency domain is $$5N\log_2(N/2)+10N-14+4N+L \text{ operations/sample}. \quad (5)$$

Figure 6:
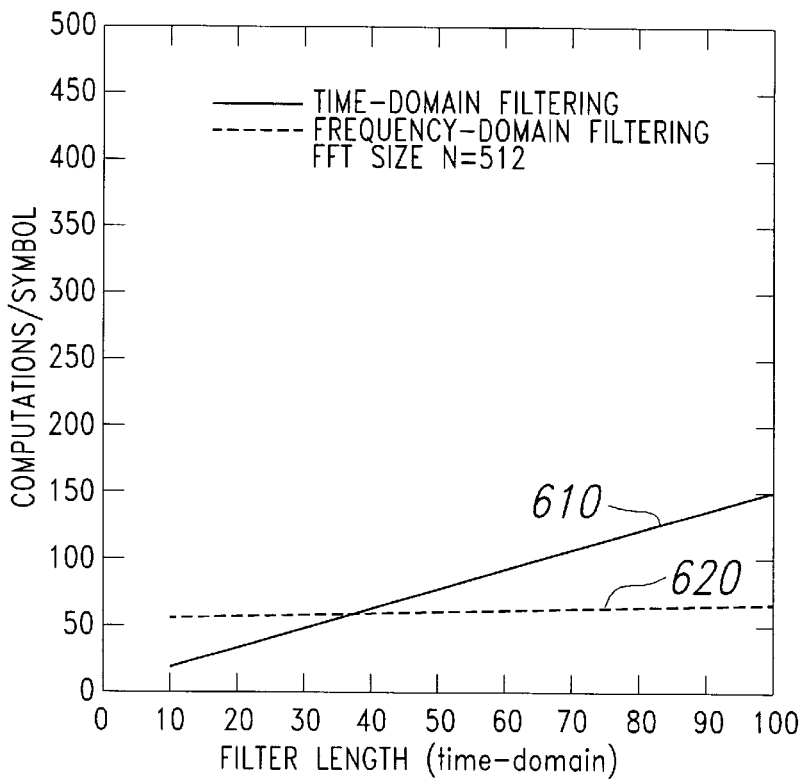
FIG. 6 shows a comparison of the number of operations required to implement a linear convolution of a real signal with a real filter in the time domain and frequency domain.

The required number of operations for the two approaches 610, 620 are plotted as a function of the length of the filter h[n] in FIG. 6.

Figure 7:
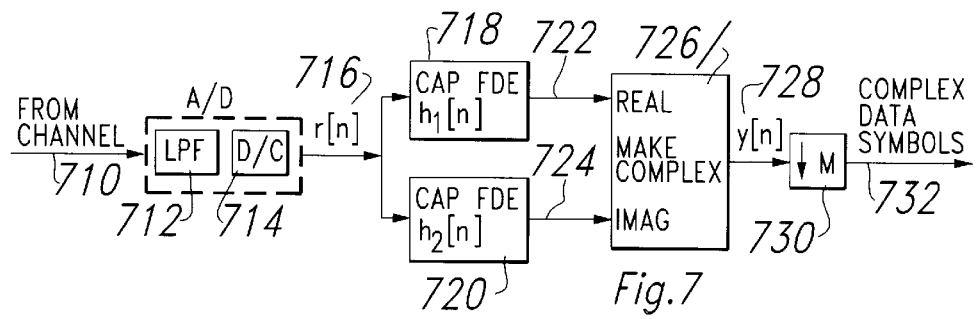
FIG. 7 shows a simple implementation of a CAP receiver of the present invention using dual frequency-domain equalizers.

A CAP receiver can incorporate the frequency-domain method of convolution to implement the receive filters (equalization and matched filtering for demodulation). A receive filter implemented in this manner is referred to as a frequency-domain equalizer (FDE). For the CAP receiver, the FDE also performs the demodulation. The simplest implementation simply replaces the two receive filters directly, as shown in FIG. 7. The dual FDEs 718, 720 each operate on a real sequence and produce a real sequence 722, 724.

Figure 1:
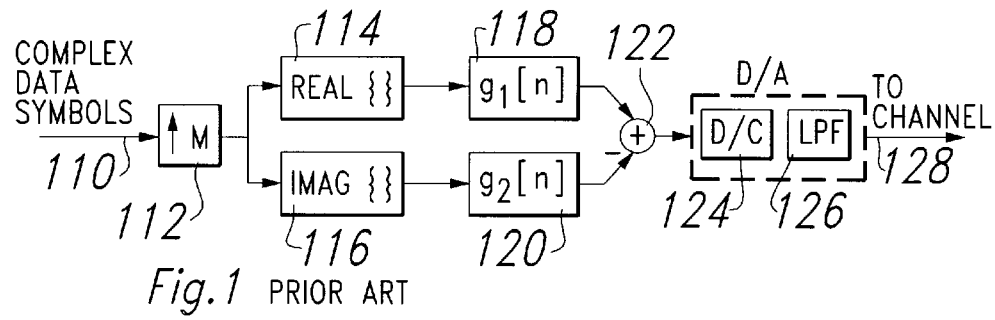
FIG. 1 shows a conventional prior art CAP transmitter.
Figure 3:
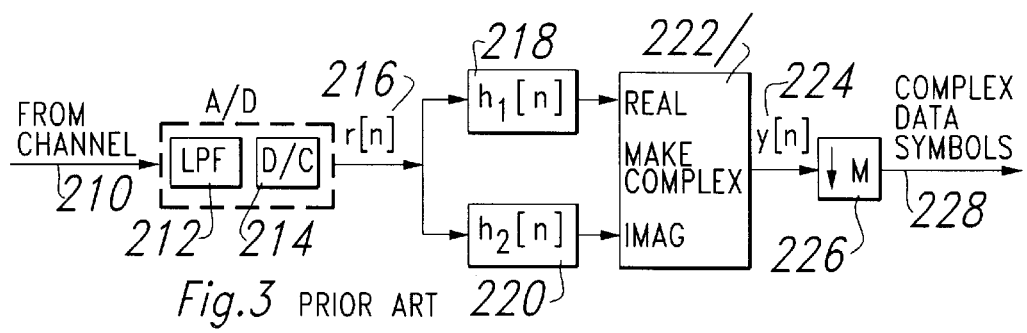
FIG. 3 shows a conventional prior art CAP receiver.
Figure 2:
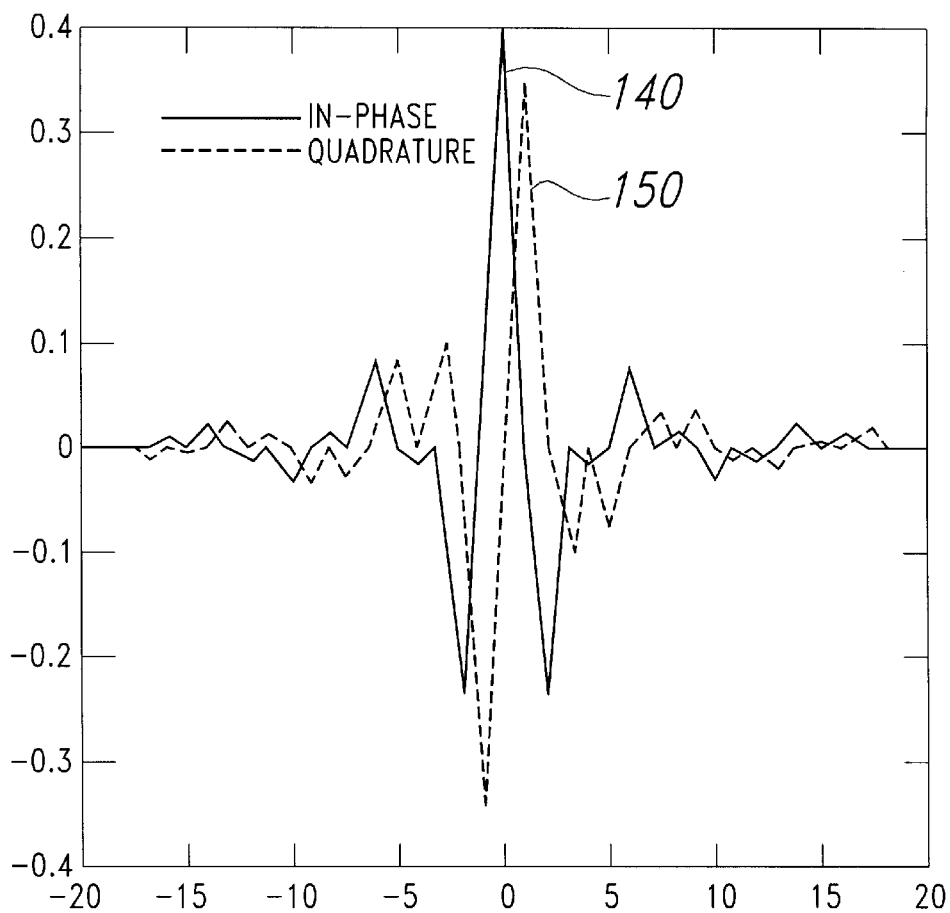
FIG. 2 shows prior art orthogonal length-35 square-root raised-cosine CAP transmission filters.

In the conventional CAP receiver, as shown in FIG. 3, a computational advantage is gained by splitting the real and imaginary components of the received signal and implementing the real convolution. In the receiver, the signal y[n] is generated by filtering the input signal with the in-phase and quadrature filters and then combining the results. This can be represented mathematically as $$y[n]=r[n]*h_1[n]+jr[n]*h_2[n] \quad (6)$$

where the symbol * indicates convolution of the two sequences. The real filters can be combined to form a complex filter h[n] as follows:

$$y[n]=r[n]*(h_1[n]+jh_2[n])=r[n]*h[n], \quad (7)$$

where $$h[n]=h_1[n]+jh_2[n]. \quad (8)$$

Figure 8:
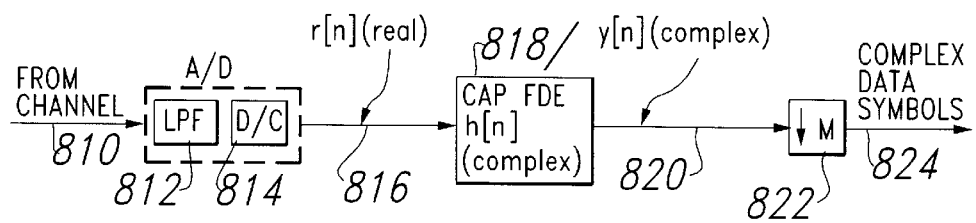
FIG. 8 shows a CAP receiver of the present invention implemented with a single frequency-domain equalizer.

Thus the two FDEs in the CAP receiver can be replaced by a single FDE that takes a real input and produces a complex output, as shown in FIG. 8. The filter implemented in the frequency domain is a complex filter whose time-domain impulse response is h[n], which is the combination of the in-phase and quadrature CAP demodulators and receive filters.

The complexity of the FDE in the CAP receiver can be reduced by exploiting the double-length FFT algorithm for computing the FFT of a real input sequence. Also, we exploit the fact that the input sequence is always taken in blocks of L samples and padded with N-L zeros. Therefore, in the first FFT stage, only L complex multiplies are required.

The complexity of the FDE in the CAP receiver can be further reduced by exploiting the fact that the sequence out of the FDE is downsampled, i.e. only every Mth sample is used. The IFFT in the FDE can be implemented with a decimation-in-time algorithm, and the IFFT structure can be pruned to eliminate unnecessary computations.

For the special case of M=4, the overall number of operations required to implement the frequency-domain CAP demodulation is approximately $$\frac{M}{L}\left[\frac{5}{2} N\log_2\left(\frac{N}{2}\right) + \frac{5}{4} N\log_2\left(\frac{N}{4}\right) + 17N - 3.5P - 9.5\right] \text{ operations/symbol.} \quad (9)$$

The number of operations required to implement the time-domain CAP demodulator (exploiting the downsampling after filtering) is $$4P-2 \text{ operation/symbol.} \quad (10)$$

Figure 9:
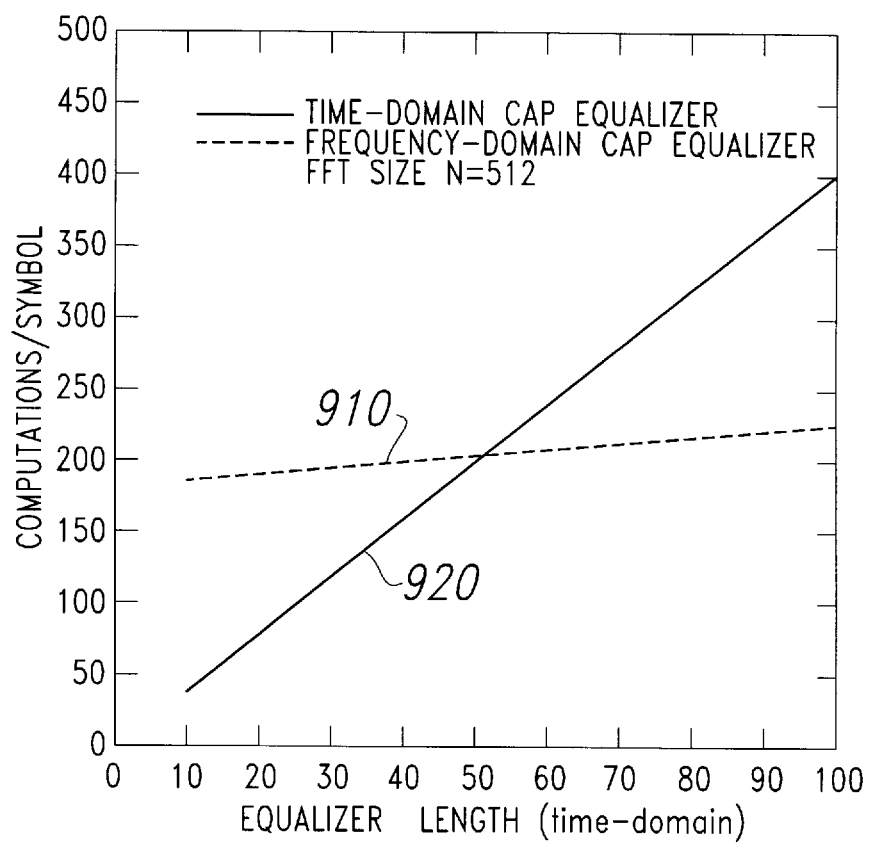
FIG. 9 shows a comparison of the number of operations required to implement a conventional CAP demodulator and a frequency-domain CAP demodulator of the present invention.

The required number of operations for the two approaches 910, 920 are plotted as a function of the length of the filter h[n] in FIG. 9.

The choice of upsample/downsample factor M in a CAP transmission system will affect the efficiency of the frequency-domain CAP receiver. As M increases, the required computations for time-domain filtering in the receiver remain roughly the same if the fact that downsampling following filtering is used to eliminate unneeded computations. However, with the frequency-domain CAP receiver, the FFT size, IFFT size, and multiplication by H[k] must be made larger even though the size of the output blocks remains the same. Thus, the required computations increase with the upsample factor. However, for low values of M such as M=2,3,4, the frequency-domain CAP receiver can prove advantageous. The number of operations that can be eliminated in the IFFT operation due to downsampling after the IFFT is directly effected by the specific value of M. Because the IFFT structure is exploited, values of 2, 4, and 8 produce the greatest savings.

A further reduction in complexity can be achieved by exploiting the fact that the FFT and IFFT are performed back-to-back with only a single multiplication of each frequency-domain coefficient between the algorithms. The operations in the algorithms can be arranged so that the last stage of the FFT computation can be combined with the equalizer multiplication and the first stage of the IFFT. This can be achieved by computing a single multiplication factor for the three stages, where the single multiplication factor the product of the three individual multiplication factors. However, this single multiplication factor must be adapted to meet the varying equalization requirements in the receiver.

A static transmission channel requires a one-time estimation of the distortion and then calculation of the filter coefficients required for proper equalization.

Transmission channels that vary significantly with time require adaptation of the equalizer to compensate for time-varying distortion. Channel estimation should be performed on a continuing basis to properly equalize the dynamic transmission channel. The rate at which the channel varies and the equalization criterion determine the amount of resources in a receiver that must be applied for the channel estimation and adjustment of the equalizer coefficients. For extremely rapidly varying channels, such as those encountered in a mobile communications system, the equalizer must adapt rapidly. In fact, it is best to adjust the equalizer coefficients after every sample. Time-domain equalizers provide the ability to adjust the coefficients after every sample is processed because the equalization operations are performed on a sample-by-sample basis.

The transmission channels encountered with most landline communication systems (such as digital subscriber line signaling) vary extremely slowly. Rapid estimation of the channel and adjustment of the equalizer coefficients is not required. If the channel remains relatively static during a period of N samples, then the equalization can be performed on a block of N samples during the entire period. If required, the channel distortion is estimated again before the next period and the equalizer adjusted before processing the next block. In general, the block duration must be chosen so that the channel does not change significantly from the estimate before another estimate is calculated.

Timing and synchronization can be performed in a block-based receiver using any of a number of algorithms designed for sample-based receivers (Proakis, J. G., *Digital Communications Third Edition*, McGraw-Hill, N.Y., 1995; Lee, Edward A. and Messerschmitt, David G., *Digital Communication*, Kluwer Academic Publishers, Boston, 1994). One particularly attractive scheme that is easily implemented in a FDE-based CAP receiver uses a direct passband timing recovery algorithm (Godard, Dominique N., *Passband Timing Recovery in an All-Digital Modem Receiver*, IEEE Transactions on Communications, COM-26:517–523, May 1978; Godard, Dominique N., U.S. Pat. No. 4,969,163- *Passband Timing Recovery in an All-Digital Modem Receiver*, November, 1990). The timing information is derived from the real-valued passband signal, avoiding delays in the timing adjustment loop and allowing fast convergence. Basically, the sampling times are adjusted to occur at time instants when the channel phases at frequencies $$f_o \pm \frac{1}{2T}$$

are equal modulo $2\pi$, where $f_o$ is the passband center frequency and T is the sampling interval. This has been shown to approximate the optimum sampling phase (Ungerboeck, G., *Adaptive Maximum Likelihood Receiver for Carrier Modulated Data Transmission Systems*, IEEE Transactions on Communications, COM-22:624–636, May 1974), and can be implemented in conjunction with the FDE in a FDE-based CAP receiver.

Having thus described one particular embodiment of the invention, various alterations, modifications and improvements will readily occur to those skilled in the art. Such alterations, modifications and improvements as are made obvious by this disclosure are intended to be part of this description even though not expressly stated herein, and are intended to be within the spirit and scope of the invention. Accordingly, the foregoing description is by way of example only, and not limiting; the invention is limited only as defined in the following claims and equivalents thereto.

What is claimed is:

1. A frequency-domain CAP modem receiver, comprising:
   a) a low pass filter connected to a data channel,
   b) an analog-to-digital (A/D) converter connected to the output of said low pass filter,
   c) a CAP frequency-domain equalizer connected to said A/D converter, and
   d) a downsampler connected to said CAP frequency domain equalizer for outputting a stream of complex data signals for decoding said frequency-domain equalizer employing a frequency-domain algorithm for implementing a convolution of two discrete-time sequences, said algorithm functioning to convert the two sequences to parallel data streams, pad them with zeros to form equal length sequences, compute the discrete Fourier transforms of the two sequences, multiply the transforms, compute their inverse discrete Fourier transforms, subject them to a combination algorithm, and convert to a serial stream.

2. A method for generating a CAP signal from a passband signal, comprising:

low pass filtering said passband signal;

converting said filtered signal to a digital signal; and

CAP frequency-domain equalizing said digital signal to equalize and demodulate said digital signal, said frequency-domain equalizing step employing a frequency-domain equalizer employing a frequency-domain algorithm for implementing a convolution of two discrete-time sequences, said algorithm functioning to convert the two sequences to parallel data streams, pad them with zeros to form equal length sequences, compute the discrete Fourier transforms of the two sequences, multiply the transforms, compute their inverse discrete Fourier transforms, subject them to a combination algorithm, and convert to a serial stream.

3. The method of claim 2, further comprising downsampling said digital signal to provide a complex data stream.

* * * * *